(12) United States Patent
Reintjes et al.

(10) Patent No.: US 10,300,625 B2
(45) Date of Patent: May 28, 2019

(54) PROCESS AND APPARATUS FOR MAKING A HYDROPHOBIZED FIBER CEMENT PRODUCT

(71) Applicant: Eternit GmbH, Heidelberg (DE)

(72) Inventors: Frank Reintjes, Ennigerloh (DE); Mario Beermann, Oelde (DE); Michael Orlowski, Oelde (DE)

(73) Assignee: Eternit GmbH, Heidelberg (DE)

( * ) Notice: Subject to any disclaimer, the term of this patent is extended or adjusted under 35 U.S.C. 154(b) by 0 days.

(21) Appl. No.: 15/556,196

(22) PCT Filed: Mar. 3, 2016

(86) PCT No.: PCT/EP2016/054512
§ 371 (c)(1),
(2) Date: Sep. 6, 2017

(87) PCT Pub. No.: WO2016/142257
PCT Pub. Date: Sep. 15, 2016

(65) Prior Publication Data
US 2018/0050466 A1    Feb. 22, 2018

(30) Foreign Application Priority Data

Mar. 9, 2015  (EP) .................................... 15158223

(51) Int. Cl.
*B28B 1/42*  (2006.01)
*B28B 1/52*  (2006.01)
(Continued)

(52) U.S. Cl.
CPC ................ *B28B 1/42* (2013.01); *B28B 1/526* (2013.01); *B28B 1/527* (2013.01);
(Continued)

(58) Field of Classification Search
CPC ........... B28B 1/42; B28B 1/526; B28B 1/527; B28B 1/008; B28B 1/52; C04B 20/0048;
(Continued)

(56) References Cited

U.S. PATENT DOCUMENTS 2,335,722 A    11/1943  Adams

FOREIGN PATENT DOCUMENTS

AU     2002/234 429 C1    9/2002
EP     2 275 391 A1       1/2011
(Continued)

*Primary Examiner* — Camie S Thompson
(74) *Attorney, Agent, or Firm* — Dilworth & Barrese, LLP

(57) ABSTRACT

The present invention relates to processes and apparatuses for producing hydrophobized fiber cement sheets as well as fiber cement sheets obtainable therewith. In particular, the present invention provides processes for manufacturing a hydrophobized fiber cement product, said process at least comprising the steps of: (i) forming at least one fiber cement film on a rotating sieve in contact with a fiber cement slurry in a vat; (ii) transferring said at least one fiber cement film from said sieve to a felt transport belt, (iii) applying a mist of a hydrophobizing agent to said at least one fiber cement film, and (iv) accumulating the fiber cement film on an accumulator roll via the felt transport belt, so as to form a hydrophobized fiber cement product. The present invention further relates to various uses of the fiber cement sheets obtainable by the processes of the invention in the building industry.

20 Claims, 3 Drawing Sheets

(51) Int. Cl.
*C04B 20/00* (2006.01)
*C04B 41/64* (2006.01)
*C04B 41/49* (2006.01)
*C04B 41/00* (2006.01)
*C04B 41/45* (2006.01)
C04B 28/04 (2006.01)
C04B 28/08 (2006.01)

(52) U.S. Cl.
CPC ........ *C04B 20/0048* (2013.01); *C04B 41/009* (2013.01); *C04B 41/4543* (2013.01); *C04B 41/4578* (2013.01); *C04B 41/4905* (2013.01); *C04B 41/64* (2013.01); *C04B 28/04* (2013.01); *C04B 28/08* (2013.01)

(58) Field of Classification Search
CPC ............ C04B 41/4578; C04B 41/4905; C04B 41/4543; C04B 41/64; C04B 41/009; C04B 28/02; C04B 28/04; C04B 28/08; C04B 20/00; C04B 1/009; C04B 1/4578; C04B 1/4905; C04B 1/4543; C04B 1/64; C04B 1/5088; C04B 1/65; C04B 1/45; C04B 1/49; C04B 28/18; C04B 2111/00827; C04B 2111/80; C04B 2111/00594; C04B 2201/20; B01J 35/004; B01J 37/0215; B01J 37/0244
USPC ...................................................... 428/297.4
See application file for complete search history.

(56) References Cited

FOREIGN PATENT DOCUMENTS

| | | |
|---|---|---|
| JP | S57-196761 A | 12/1982 |
| JP | H03-213304 A | 9/1991 |
| WO | 94/03318 A1 | 2/1994 |

PROCESS AND APPARATUS FOR MAKING A HYDROPHOBIZED FIBER CEMENT PRODUCT

FIELD OF THE INVENTION

The present invention relates to processes and apparatuses for producing hydrophobized fiber cement products as well as to the hydrophobized fiber cement products obtainable therewith. The present invention further relates to various uses of the hydrophobized fiber cement products, obtainable by these processes, especially as building materials.

BACKGROUND OF THE INVENTION

The Hatschek process for the production of fiber cement sheets is well known in the art. Typically, a number of fiber cement monolayers are created by means of successively installed rotating sieve drums. The layers are picked up and stacked on an endless water-permeable transport belt so as to form a fiber cement multilayered slab. The multilayered slab, which is transported in the production direction, is subsequently contacted by a rotating accumulator roll, which ensures the accumulation of a plurality of fiber cement multilayered slabs. After reaching a predefined thickness, the resulting fiber cement sheet is cut, taken from the roll, and put on a transport device. The fiber cement sheet is subsequently optionally processed and cured in a suitable way to obtain the finished end product.

The resulting fiber cement products, however, typically have performance drawbacks relating to resistance to water induced damages, water permeability, water migration ability (also known as wicking) and freeze thaw resistance. These drawbacks are largely due to the presence of pore spaces and water conducting channels within and in between the fibers of the cementitious matrix. The porosity of fiber cement products facilitates water transportation throughout the composite materials and can affect the long-term durability and performance of the material in certain environments.

To counter the above indicated drawbacks, the outer surface of a finished fiber cement product is sometimes coated with one or more layers of a coating agent. However, only a small crack or minor damage of the coating outer layer of the product is already sufficient for allowing water to trickle into the fiber cement mass, thereby undoing the products water-impermeable properties.

Accordingly, there remains a need for an efficient method for preventing damage and degradation to a fiber cement building material, particularly due to water and/or other environmental effects. In addition, there is a need for improved material formulations and products having an increased resistance to water and/or environmental degradation.

SUMMARY OF THE INVENTION

An object of the present invention is to provide processes for producing hydrophobized fiber cement products with improved properties.

In this regard, the present inventors have developed a novel industrial process for the production of high strength hydrophobized fiber cement products comprising one or more thin layers of a hydrophobizing agent, which are incorporated within the mass of the fiber cement product.

In particular, the processes of the present invention include applying a hydrophobizing product directly to the fiber cement material (at one or more stages) during the Hatschek formation process of the fiber cement product.

Also, the present inventors have designed an apparatus to perform such a process on an industrial scale. Surprisingly, it has been found that the tolerance of the formed fiber cement sheets towards water and freeze-thaw conditions is improved as opposed to the known fiber cement products. Indeed, most prior art products comprise an outer layer of a coating agent. This outer surface coating however does not confer a high degree of water-resistance to the product since only a small crack or minor damage of the hydrophobizing outer layer (which is easily and commonly generated during the manufacturing, packaging, transport and/or installation process) is already sufficient for water to damage the fiber cement product.

Furthermore, the few prior art processes where a hydrophobizing agent is applied during the production process have the problem of not being able to accurately tune the amount of product applied, leading to either an insufficient hydrophobization of the end product or an over-hydrophobization, the latter of which results in a non-uniform internal structure and a decreased strength of the end product.

In the processes of the present invention, however, the amount of hydrophobizing agent can be accurately tuned during the process, allowing the manufacturing of fiber cement end products having virtually any degree of hydrophobicity.

Finally, it was observed by the inventors that, while the end products contain separately formed layers of different materials, they are nevertheless characterized by a high strength and a high consistency, which is at least comparable to non-hydrophobized (prior art) products.

In a first aspect, the present invention provides processes for manufacturing hydrophobized fiber cement products, the processes at least comprising the steps of:
  (i) forming at least one fiber cement film on a rotating sieve in contact with a fiber cement slurry in a vat;
  (ii) transferring the at least one fiber cement film from the sieve to a felt transport belt,
  (iii) applying a mist of a hydrophobizing agent to the at least one fiber cement film, and
  (iv) accumulating the fiber cement film on an accumulator roll via the felt transport belt, so as to form a hydrophobized fiber cement product.

In particular embodiments, the step (iii) of applying a mist of a hydrophobizing agent to the at least one fiber cement film is performed simultaneously with the step (iv) of accumulating the fiber cement film on an accumulator roll via the felt transport belt.

In other particular embodiments, the step (iii) of applying a mist of a hydrophobizing agent to the at least one fiber cement film is performed prior to the step (iv) of accumulating the fiber cement film on an accumulator roll via the felt transport belt.

In certain particular embodiments, one or more of the steps i) to iv) are repeated. In further particular embodiments, the process according to the present invention is a continuous process.

In certain particular embodiments, the step (iii) of applying a hydrophobizing agent to the at least one fiber cement film is performed by at least one of the steps chosen from the group consisting of: spraying, spattering, and evaporating a mist of a hydrophobizing agent onto the at least one fiber cement film.

In certain particular embodiments, the hydrophobizing agent at least comprises an active hydrophobizing component (i.e. active hydrophobizing ingredient), which comprises silicon (Si). In further particular embodiments, the hydrophobizing agent at least comprises a silicone oil and/or a silicone varnish. In yet further particular embodiments, the hydrophobizing agent at least comprises one or more of active hydrophobizing ingredients chosen from the group consisting of an alkylsilicon, an alkylalkoxysilicon, an alkylsilane, an alkylalkoxysilane, a polydiorganosiloxane, an organo-modified siloxane, an organo-modified alkoxysilane, a silicone hydride, a silicone resin.

In particular embodiments, the active hydrophobizing ingredients in the hydrophobizing agent are a mixture of a silane and a siloxane.

In particular embodiments, the hydrophobizing agent comprises at least 40% (of the total volume of the mixture), such as at least 45%, of active hydrophobizing ingredients. In further particular embodiments, the hydrophobizing agent comprises at least 50% (of the total volume of the mixture) of active hydrophobizing ingredients. In still further particular embodiments, the hydrophobizing agent comprises at least 55% (of the total volume of the mixture), such as at least 60%, of active hydrophobizing ingredients.

In particular embodiments of the invention, a mist of a hydrophobizing agent is applied such that only a very thin film of agent is applied on a surface of a fiber cement product. In further particular embodiments of the processes of the invention, a mist of hydrophobizing agent is applied onto a fiber cement surface in an amount of 0.1 mg/cm$^2$ to 2 mg/cm$^2$. In yet further particular embodiments, a mist of hydrophobizing agent is applied onto a fiber cement surface in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$.

The inventors have found that when applying a mist of hydrophobizing agent in the abovementioned amounts to at least two monolayers of the fiber cement product an optimal and uniform hydrophobization of the fiber cement product can be achieved without negatively affecting any other beneficial characteristics of the product, such as strength, weathering resistance etc.

In particular embodiments, between two and six monolayers of the fiber cement product are treated with a mist of a hydrophobizing agent in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$.

In further particular embodiments, between two and six monolayers of the fiber cement product are treated with a mist of a hydrophobizing agent in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$, wherein the hydrophobizing agent comprises one or more active hydrophobizing ingredients chosen from the group consisting of alkylsilicon, an alkylalkoxysilicon, an alkylsilane, an alkylalkoxysilane, a polydiorganosiloxane, an organo-modified siloxane, an organo-modified alkoxysilane, a silicone hydride, a silicone resin.

In still further particular embodiments, between two and six monolayers of the fiber cement product are treated with a mist of a hydrophobizing agent in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$, wherein the hydrophobizing agent comprises as active hydrophobizing ingredients a mixture of a silane and a siloxane.

In particular embodiments, the processes according to the invention further comprise the step of cutting the hydrophobized fiber cement product obtained in step (c) to a predetermined length. In yet further particular embodiments, the processes according to the invention further comprise the step of curing the hydrophobized fiber cement product obtained in step (c).

In a second aspect, the present invention provides apparatuses for manufacturing a hydrophobized fiber cement product, the apparatuses at least comprising:

(i) a Hatschek section for the formation of one or more Hatschek fiber cement layers, at least comprising:
  a felt transport belt
  one or more machine vats suitable for being fed with a fiber cement slurry,
  one or more sieves for producing a fiber cement film on the felt transport belt, each of which sieves is housed within the one or more machine vats so as to be in contact with the fiber cement slurry when in operation, and
  an accumulator roll for accumulating the fiber cement film via the felt transport belt, (ii) a hydrophobization section for applying a mist of a hydrophobizing agent to the fiber cement film, comprising at least one distribution system, which is suitable for discharging a hydrophobizing agent onto the fiber cement film.

In certain particular embodiments of the apparatuses of the invention, the at least one distribution system is chosen from the group consisting of: a spattering distribution device, a spraying distribution device or an evaporation distribution device.

The inventors have found that the optimal amount of hydrophobizing agent can be applied onto the surface of a fiber cement product by designing a distribution device having a nozzle with adjustable orifices (e.g. in the form of diafragma's) with a diameter of between about 0.28 mm to about 1.3 mm. When working at a normalized pressure of 3 bar in the supply wires or supply pipes of the device, the flow rate capacity of the distribution device ranges from about 0.067 liters/minute (at an orifice diameter of about 0.28 mm) to 1.6 liters/minute (at an orifice diameter of about 1.3 mm), and can be adjusted by the skilled person depending on the speed of the fiber cement product production process. The nozzle of the distribution device has been designed such that the spraying angle (i.e. the angle in between which hydrophobizing product is sprayed onto the fiber cement product) is about 65°.

Using the above described distribution device, a mist (i.e. micro-droplets of hydrophobizing agent suspended in air) of a hydrophobizing agent is created and distributed uniformly on the surface of a fiber cement product in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$.

When applying a mist of hydrophobizing agent in the above-mentioned amounts to at least two monolayers of the fiber cement product an optimal and uniform hydrophobization of the fiber cement product can be achieved without negatively affecting any other beneficial characteristics of the product, such as strength, weathering resistance etc.

In particular embodiments, the apparatuses according to the present invention further comprise cutting means for cutting the uncured fiber cement product to a predetermined length.

In particular embodiments, the apparatuses according to the present invention further comprise means to:
(i) simultaneously activate or deactivate the Hatschek section and the hydrophobization section and/or
(ii) alternatingly activate or deactivate the Hatschek section and the hydrophobization section.

In a third aspect, the present invention provides fiber cement products obtainable by the process according to the invention.

In a fourth aspect, the present invention provides uses of the fiber cement products and sheets obtainable by the processes according to the present invention, and more particularly uses in the building industry. In particular embodiments, the fiber cement sheets produced by the processes of the present invention can be used to provide an outer surface to walls, both internal as well as external, a building or construction, e.g. as façade plate, siding, etc.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
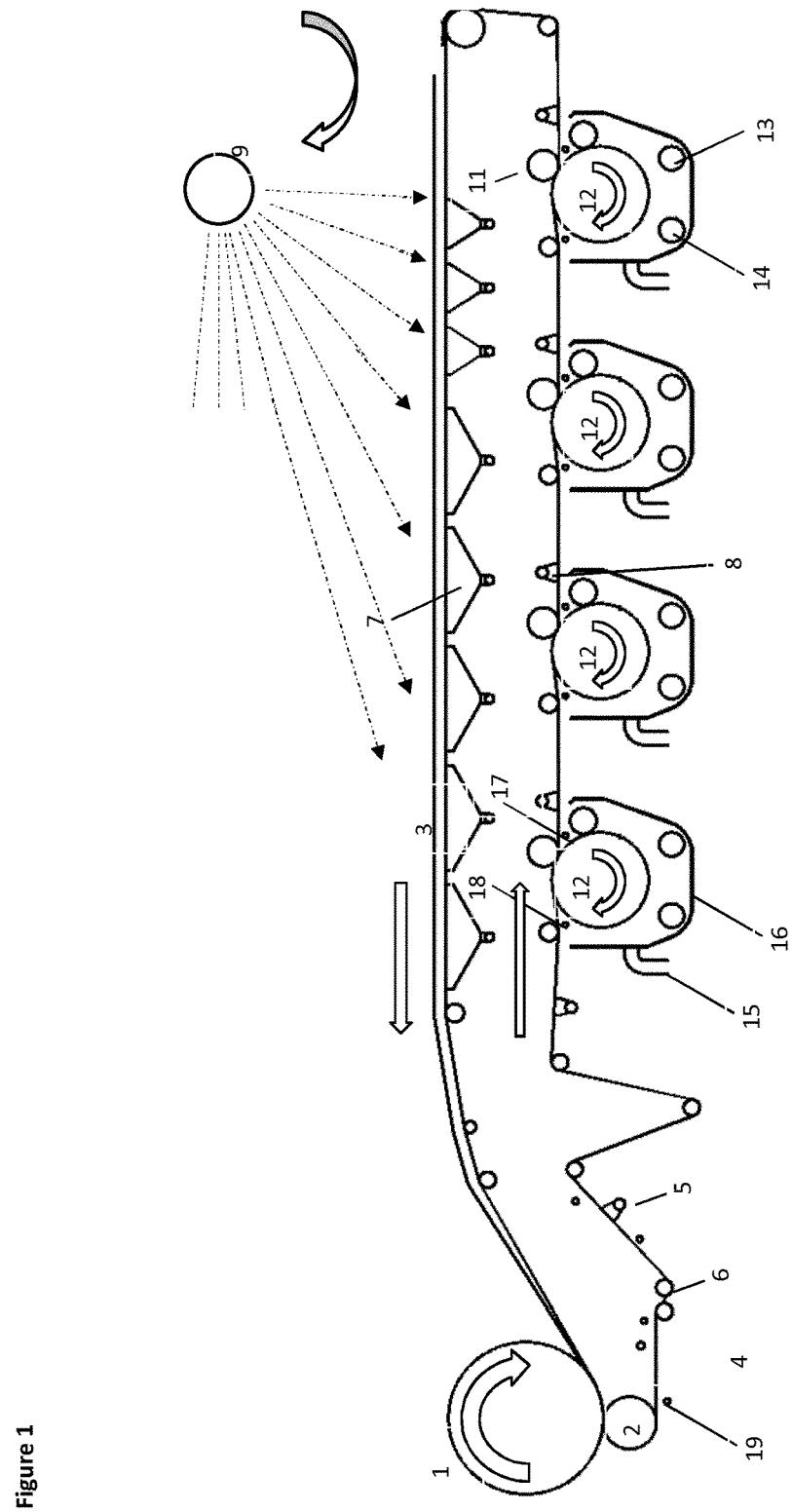
FIG. 1 is a schematic illustration of one embodiment of the process and apparatus according to the invention encompassing a combination of a Hatschek section with a hydrophobation section, which includes a spraying device installed adjacent to the endless transport belt and before the accumulation roll.

The same reference signs refer to the same, similar or analogous elements in the different figures.

REFERENCES

1 Accumulation roll
2 Main drive
3 Felt transport belt
4 Felt cleaning area
5 Felt drying vacuum boxes
6 Felt rollers
7 Upper vacuum boxes
8 Inverted vacuum boxes
9 Spraying hydrophobization device
10 Spattering hydrophobization device
11 Couching roller
12 Sieve
13 Orientation screw
14 Vat agitators
15 Vat slurry feeding inlet
16 Vat
17 Sieve washing spray
18 Layer washing spray
19 Felt cleaning spray

DESCRIPTION OF ILLUSTRATIVE EMBODIMENTS

The present invention will be described with respect to particular embodiments.

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives. In the context of the processes of the present invention, the fiber cement slurry can thus be provided by one or more sources of at least cement, water and fibers. Optionally, these one or more sources of at least cement, water and fibers may operatively be connected to a continuous mixing device constructed so as to form a cementitious fiber cement slurry. In particular embodiments, when using cellulose fibers or the equivalent of waste paper fibers, a minimum of about 2 wt %, such as at least about 3 wt %, such as at least about 4 wt % of these cellulose fibers (compared to the total initial dry weight of the slurry) may be used. In further particular embodiments, when exclusively cellulose fibers are used, between about 4 wt % to about 12 wt %, such as more particularly, between about 7 wt % and about 10 wt % of these cellulose fibers (compared to the total initial dry weight of the slurry) may be used. If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-module fibers, such as polypropylene, polyvinyl acetate, polycarbonate or acrylonitrile fibers the proportion can be lower than the proportion of the replaced cellulose fibers. The fineness of the fibers (measured in Shopper-Riegler degrees) is in principle not critical to the processes of the invention. Yet in particular embodiments, where autoclave-cured fiber cement products are envisaged, it has been found that a range between about 15 DEG SR and about 45 DEG SR can be particularly advantageous for the processes of the invention. In alternative embodiments, where air-cured fiber cement products are envisaged, it has been found that a range between about 35 DEG SR and about 75 DEG SR can be particularly advantageous for the processes of the invention.

"Fiber(s)" present in the fiber cement slurry as described herein may be for example process fibers and/or reinforcing fibers which both may be organic fibers (typically cellulose fibers) or synthetic fibers (polyvinylalcohol, polyacrilonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The terms "predetermined" and "predefined" as used herein when referring to one or more parameters or properties generally, and particularly in the context of the present invention, mean that the desired value(s) of these parameters or properties have been determined or defined beforehand, i.e. prior to the start of the process for producing the products that are characterized by one or more of these parameters or properties.

The term "fiber cement layer" as used herein generally, and particularly in the context of the present invention, refers to any flat, optionally substantially rectangular, layer or cake essentially consisting of a fiber cement composition and having a thickness of at least about 1 mm, in particular between about 1 mm and 200 mm, more particularly between about 2 mm and about 150 mm, most particularly between about 4 mm and about 100 mm, such as between about 8 mm and about 10 mm.

A "Hatschek fiber cement layer" or a "Hatschek layer" as interchangeably used herein refers to a fiber cement layer (as defined herein), which is produced according to a Hatschek process, which at least comprises the steps of:

(i) building a fiber cement film on a sieve, which sieve rotates so as to be in contact with a fiber cement slurry in a vat;

(ii) transferring the fiber cement film from the sieve to the felt transport belt, and (iii) accumulating the fiber cement film on an accumulator roll via the felt transport belt.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

The term "water-permeable" as used herein when referring to a water-permeable (region of a) transport belt generally, and particularly in the context of the present invention, means that the material of which the water-permeable (region of the) belt is made allows water to flow through its structure to a certain extent.

The "water-permeability" as used herein when referring to the water-permeability of a (region of a) transport belt generally, and particularly in the context of the present invention, refers to the extent or degree to which the material of which the water-permeable (region of the) belt is made, allows water to flow through its structure. Suitable materials for water-permeable transport belts are known to the person skilled in the art, such as but not limited to felts.

The terms "hydrophobize", "hydrophobizing", "hydrophobation", "hydrophobizing agent", "hydrophobing agent", "hydrophobating agent" and/or "hydrophobic agent" as used interchangeably herein, generally, and particularly in the context of the present invention, refer to the water-repellent effect of certain agents and/or to water-repellent agents, which can be used or applied on objects, surfaces, materials or compositions, and especially on hydrophilic inorganic surfaces, such as cement, fiber cement, concrete, inorganic powders, minerals and fillers, and the like in order to impart these objects, surfaces, materials or compositions and the like with water-repellent properties.

The term "a thin layer", when referring to the amount of hydrophobizing agent that is applied to a fiber cement product in the context of the present invention, means a layer having a thickness of between about 0.001 mm and about 5 mm, such as in particular between about 0.005 mm and about 3 mm, such as between about 0.01 mm and about 2 mm, such as between about 0.1 and about 1 mm.

The term "mist", when referring to the amount of a hydrophobizing agent that is applied to a fiber cement product in the context of the present invention, means that the hydrophobating agent is applied in the form of a vapour or an aerosol (i.e. a suspension of small droplets, having a diameter of between about 0.2 μm to about 200 μm, of the agent in air) to ensure that it is uniformly spread over a surface of a fiber cement in very small amounts and at very low concentrations.

The terms "hydrophobized (fiber cement) product", "hydrophobized fiber cement film (layer)", "hydrophobated (fiber cement) product" and/or "hydrophobated fiber cement film (layer)" as used interchangeably herein refer to products, such as fiber cement products or fiber cement films (layers), which have been treated, either partially or completely before, during or after their production, with a hydrophobizing (or hydrophobic) agent. For example, a hydrophobized (hydrophobated) fiber cement product can be treated with a hydrophobizing (i.e. hydrophobic) agent, on one or more of its outer surfaces, on one or more of its inner surfaces, on its internal structure, on its material or on its composition, such as only on its cementitious matrix, or only on its fibers, inorganic powders, minerals and/or fillers. In particular, a "hydrophobized (hydrophobated) fiber cement product" or a "hydrophobized (hydrophobated) fiber cement sheet" as used herein will comprise at least one "hydrophobized (hydrophobated) fiber cement film layer".

A "non-hydrophobized (fiber cement) product" or a "non-hydrophobized fiber cement (film) layer" as used in the present context refers to a product, such as a fiber cement product or a fiber cement (film) layer, which has not been treated before, during or after its production, with a hydrophobizing agent. In particular, a "non-hydrophobized fiber cement product" or a "non-hydrophobized fiber cement sheet" as used herein will only comprise "fiber cement film layers", which are non-hydrophobized.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present invention provides processes for manufacturing of hydrophobized fiber cement products with improved properties.

In this regard, the present inventors have developed a novel industrial process for the production of hydrophobized fiber cement products, which involves the production of one or more Hatschek layers according to the Hatschek principle, while incorporating simultaneously one or more thin layers of a hydrophobizing agent in between these one or more Hatschek layers. In this way, one is able to produce fiber cement products having the same advantageous properties as the conventional Hatschek fiber cement products, and in addition having strong water-repellent properties throughout their entire internal structure or mass (and not only on their outer surface as was the case with known hydrophobized products).

In particular, the processes of the present invention include applying a mist of a hydrophobizing product directly to the fiber cement material (at one or more stages) during the actual production process, the latter being a Hatschek production process.

Hatschek processes are generally known in the art and performed using a Hatschek machinery. As is known by the person skilled in the art, the fundamental part of a Hatschek machinery consists of one or more vats, in each of which vats a cylindrical sieve rotates in contact with a dilute water based fiber cement slurry. On the surface of each of the sieves, a filtering film and mineral materials including (Portland) cement is formed. The sieve cylinder is mounted on an axle and driven by a an endless felt belt wrapped around the top of the sieve by a couch roller. The felt is threaded around a drive or anvil roller and a tail roller. The drive or anvil roller is pushed into hard contact with an accumulation roller. The actual Hatschek layers are formed as follows. As the clean sieve is pulled under the slurry in the vat, water from the slurry runs through the sieve depositing a soft porous film of fibers and cement on the surface of the sieve. The sieve carrying the film exiting the vat is brought into contact with the felt belt, which is stretched tightly across the sieve. This removes much of the water from the film by forcing it back through the film. The solid film floats on this layer of water and is transferred to the transport belt partly in response to the effect of removal of water and partly because the felt has a greater affinity for the film than the sieve. The film is carried on the transport belt to an accumulator roll to which it is transferred by further removal of water at high pressure. A sufficient number of films are wrapped on the accumulator roll to form a layer of the desired thickness. The stack of films is then removed from the roller and laid out flat to form the Hatschek layer. The action of dewatering successive films in contact with each other under pressure is sufficient to bind the films together to form a contiguous solid layer.

Similar to a conventional Hatschek process, one of the steps in the processes of the present invention comprises the formation of a fiber cement film on a sieve, while the sieve rotates in contact with fiber cement slurry in a vat.

Also in line with a conventional Hatschek principle, the fiber cement film is then transferred from the sieve to a transport felt belt to be subsequently accumulated on an accumulator roll upon dewatering via the felt transport belt.

However, distinct from a conventional Hatschek process, another step in the processes of the present invention comprises one or more (i.e. the same repeated or different separate) steps of applying a mist of a hydrophobizing agent to the formed fiber cement film. This hydrophobation treating step can be done at any stage in between the transfer of the fiber cement film to the transport belt and the end of the production process.

In particular embodiments, and preferably, the fiber cement film is covered uniformly with a thin layer of hydrophobizing agent within the reach limits of the dispensing device used for hydrophobization.

A hydrophobizing agent as described herein is applied to the fiber cement film in the form of a mist, i.e. a suspension of tiny droplets of hydrophobizing agent in air (also referred to as an aerosol). The suspended droplets of the mist of hydrophobizing agent as applied to the fiber cement products according to the processes of the invention have a diameter of between about 0.2 µm and about 200 µm.

Accordingly, in particular embodiments, the step (iii) of applying a mist of a hydrophobizing agent to the at least one fiber cement film is performed prior to the step (iv) of accumulating the fiber cement film on an accumulator roll via the felt transport belt. In these embodiments, a small amount, e.g. a thin layer, of hydrophobizing agent can be applied onto the surface of the fiber cement film that is formed (and still present) on the felt transport belt. In the processes according to the invention, a hydrophobizing agent can be applied by a distribution system for discharging the agent onto the fiber cement film by means of a spattering, a spraying, and/or an evaporating mechanism as further described herein. In further particular embodiments, when the hydrophobation step is performed discontinuously at a stage prior to the Hatschek accumulation step (iv), a fiber cement end product (i.e. in its finalized cut form) will comprise at least one but preferably two or more layers of fiber cement film, which are coated on one side with a hydrophobizing agent. In further particular embodiments, when the hydrophobation step is performed continuously at a stage prior to the Hatschek accumulation step, each of the fiber cement films within a fiber cement end product (i.e. in its finalized cut form) will be coated on one side with a hydrophobizing agent.

In other particular embodiments, the step (iii) of applying a hydrophobizing agent to the at least one fiber cement film is performed simultaneously with the step (iv) of accumulating the fiber cement film on an accumulator roll via the felt transport belt. In such particular embodiments, a small amount, e.g. a thin layer, of hydrophobizing agent may be discharged onto a previously formed fiber cement film layer during (i.e. simultaneously with) the Hatschek accumulation step in the processes of the present invention. Typically, a Hatschek fiber cement layer is formed by producing a series of fiber cement films (primary layers or monolayers) and subsequently juxtaposing these on an accumulator roll (also referred to as a forming cylinder). Thus, in these particular embodiments, a small amount of hydrophobizing agent is discharged onto a previously formed fiber cement film or onto an accumulation of previously formed fiber cement films already wound onto the accumulator roll. Accordingly, in these particular embodiments of the processes of the present invention, the hydrophobizing agent is applied onto the fiber cement film, which is present on the accumulator roll, using a distribution system working by means of a spattering, a spraying, and/or an evaporating mechanism as further described herein. In particular embodiments, when the hydrophobation step is performed discontinuously during the Hatschek accumulation step, a fiber cement end product (i.e. in its finalized cut form) will comprise at least one but preferably two or more layers of fiber cement film, which are coated on one side with a hydrophobizing agent. In further particular embodiments, when the hydrophobation step is performed continuously during the Hatschek accumulation step, each of the fiber cement films within a fiber cement end product (i.e. in its finalized cut form) will be coated on one side with a hydrophobizing agent.

In yet alternative embodiments, a hydrophobizing agent may be applied onto a previously formed fiber cement film after production of the final but uncured Hatschek fiber cement product (i.e. in its finalized cut form). Typically, a Hatschek fiber cement product, after being formed on the accumulator roll, may be cut to a predetermined length. Thus, in these particular embodiments, applying a hydrophobizing agent onto a previously formed fiber cement film (being in this case the upper or lower monolayer film of the finalized Hatschek product) may be done after cutting the Hatschek layer and by subsequently pouring, spattering, spraying, roll coating and/or evaporating a small amount, e.g. a thin layer, of hydrophobizing agent onto the formed but uncured Hatschek layer.

Thus, in principle, using the processes of the invention, an uncured fiber cement product may comprise any combination of superimposed hydrophobized and non-hydrophobized fiber cement films, thus providing a fiber cement sheet comprising one or more intercalating layers of hydrophobizing agent, which are incorporated in between the different Hatschek film layers.

For instance, in certain specific embodiments, a fiber cement product (i.e. in its finalized cut form) produced according to the processes of the invention may comprise one or more lower non-hydrophobized film layers and on top of that one or more upper hydrophobized film layers or vice versa, i.e. one or more lower hydrophobized film layers and on top of that one or more upper non-hydrophobized film layers.

Alternatively, in certain specific embodiments, a fiber cement product (i.e. in its finalized cut form) produced according to the processes of the invention may comprise in an alternating order one or more non-hydrophobized film layers and one or more hydrophobized film layers i.e. a non-hydrophobized film layer superimposed by a hydrophobized film layer, superimposed by a non-hydrophobized film layer, superimposed by a hydrophobized film layer and so on or vice versa, i.e. i.e. a hydrophobized film layer superimposed by a non-hydrophobized film layer, superimposed by a hydrophobized film layer, superimposed by a non-hydrophobized film layer and so on. Also, in certain specific embodiments, a fiber cement product (i.e. in its finalized cut form) produced according to the processes of the invention may comprise one or more lower non-hydrophobized film layers; on top of that one or more hydrophobized film layers; on top of that one or more non-hydrophobized film layers and so on or vice versa, i.e. one or more lower hydrophobized film layers, on top of that one or more non-hydrophobized film layers, on top of that one or more hydrophobized film layers and so on.

It should be understood that the fiber cement products produced according to the processes of the invention are not limited as to the number of hydrophobized and non-hydrophobized fiber cement film layers comprised therein, which is in principle limitless. In particular embodiments, the fiber cement products of the present invention may comprise at least two, such as at least three, such as at least four, at least five, at least six, at least seven, at least eight, at least nine, such as at least ten, eleven, twelve, thirteen, fourteen, fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, thirty-one, thirty-two, thirty-three, thirty-four, thirty-five, thirty-six, thirty-seven, thirty-eight, thirty-nine, fourty or more superimposed film layers, some of which are hydrophobized and some of which are non-hydrophobized fiber cement film layers. In further particular but non-limiting embodiments, the fiber cement products of the present invention may comprise at least three superimposed film layers, the first being a non-hydrophobized layer, the second being a hydrophobized layer and the third being again a non-hydrophobized layer.

In certain particular embodiments, one or more of the steps i) to iv) are repeated. In further particular embodiments, the process according to the present invention is a continuous process.

In certain particular embodiments, the step (iii) of applying a mist of a hydrophobizing agent to the at least one fiber cement film is performed by at least one of the steps chosen from the group consisting of: spraying, spattering, and evaporating a mist of a hydrophobizing agent onto the at least one fiber cement film.

Thus, in particular embodiments, the step (iii) of applying a hydrophobizing agent to the at least one fiber cement film is performed by continuously and randomly spattering, spraying or sprinkling (droplets of) a hydrophobizing agent onto the formed fiber cement layer. In these particular embodiments, the fiber cement slurry distribution process at least comprises one or more spattering and/or spraying and/or sprinkling distribution steps, such as at least one spattering and at least one spraying distribution step or at least one spattering and at least one sprinkling step.

In these particular embodiments, the step (iii) of applying a hydrophobizing agent to the at least one fiber cement film is performed through one or more spattering devices, such as for instance but not limited to one or more agitated brush systems, which continuously and randomly spatter (droplets of) a hydrophobizing agent to the fiber cement film.

According to these particular embodiments, the one or more agitated brush-like devices, such as bristle-brush-like devices, are partly or entirely in contact with a source of hydrophobizing agent. In this way, droplets of hydrophobizing agent stick to and are picked up by the bristles of the one or more brush-like devices. Through agitation of the one or more brush-like devices, the droplets of hydrophobizing agent are discharged from the different bristles of the one or more brush-like devices onto the fiber cement film. Thus, according to these particular embodiments, a plurality of bristles are used in a brush-like configuration, which is agitated (e.g. rotated, vibrated, etc.) so as to flick small droplets of the hydrophobizing agent from the supply source to the fiber cement film. Such dispensing devices may be in a brush form (such as a bristle-brush form) either in a roll or cylindrical configuration, or in an upstanding array configuration which, when agitated, flicks the pellets or droplets of hydrophobizing agent from the edge of the bristles onto the fiber cement film. It will be understood that spattering hydrophobizing agent onto the formed fiber cement film can be done prior to, simultaneously with, or after the accumulation step (iv) of the processes of the invention, as described herein.

In still further particular embodiments, the step (iii) of applying a hydrophobizing agent to the at least one fiber cement film is performed through one or more spraying or sprinkler systems, which randomly spray (e.g. by evaporation extraction) or sprinkle (droplets of) hydrophobizing agent, provided by one or more sources, onto the fiber cement film. Characteristics of spraying or sprinkler devices suitable for use in the present invention are not critical to the present invention as long as such devices are configured to discharge hydrophobizing agent droplets from an atomizer, spray nozzle or other device (part) onto a fiber cement film in a substantially uniform manner. The spraying or sprinkler devices for use in the present invention are known to the person skilled in the art and can be developed using routine techniques.

It will be understood that spraying or sprinkling a hydrophobizing agent onto the formed fiber cement film can be done prior to, simultaneously with, or after the accumulation step (iv) of the processes of the invention, as described herein.

In yet further particular embodiments, the step of applying or discharging the hydrophobizing agent on the fiber cement film can be performed through any suitable combination of the one or more dispensing systems as described herein. This means that a particular fiber cement film layer can be submitted to one or more hydrophobization steps, depending on the particular application or use of the fiber cement end product.

Yet in an alternative scenario according to these specific embodiments, the step of discharging or applying a hydrophobizing agent also be performed by (i) first spattering (droplets of) a hydrophobizing agent onto the fiber cement film using one or more brush-like dispensing systems, and then producing a mist of hydrophobizing agent onto the fiber cement film by using one or more spraying or sprinkling devices, which are applied onto the fiber cement film or (ii) first spraying or sprinkling (droplets of) a hydrophobizing agent onto the fiber cement film using one or more spraying or sprinkling systems and then spattering (droplets of) a hydrophobizing agent onto the fiber cement film using one or more brush-like dispensing systems. It will also be clear from the description herein that each of such different distribution devices, when installed consecutively, each and independently of each other can be used either prior to, simultaneously with, or after the accumulation step (iv) of the processes of the invention, as described herein. It is further envisaged by the present invention that these different distribution systems can either be used to dispense the same or different one or more hydrophobizing agents.

In the processes of the present invention, in order to obtain a fiber cement sheet with a predetermined and accurate degree of hydrophobation, the amount of hydrophobizing agent that is discharged or applied on the fiber cement film per time unit is controlled but will depend on different parameters, such as the type and predetermined dimensions of the final product to be made and the specific composition of the fiber cement slurry.

With the present invention, the inventors have found that the optimal amount of hydrophobizing agent can be applied onto the surface of a fiber cement product by designing a distribution device having a nozzle with adjustable orifices (e.g. in the form of diafragma's) with a diameter of between about 0.28 mm to about 1.3 mm. When working at a normalized pressure of 3 bar in the supply wires or supply pipes of the device, the flow rate capacity of the distribution device ranges from about 0.067 liters/minute (at an orifice diameter of about 0.28 mm) to 1.6 liters/minute (at an orifice diameter of about 1.3 mm), and can be adjusted by the skilled person depending on the speed of the fiber cement product production process. The nozzle of the distribution device has been designed such that the spraying angle (i.e. the angle in between which hydrophobizing product is sprayed onto the fiber cement product) is about 65°.

Using the above described distribution device, a mist (i.e. micro-droplets of hydrophobizing agent suspended in air) of a hydrophobizing agent is created and distributed uniformly on the surface of a fiber cement product in an amount of 0.2 mg/cm$^2$ to 1.8 mg/cm$^2$, more preferably 0.3 mg/cm$^2$ to 1.6 mg/cm$^2$, most preferably 0.4 mg/cm$^2$ to 1.5 mg/cm$^2$.

When applying a mist of hydrophobizing agent in the above-mentioned amounts to at least two monolayers of the fiber cement product an optimal and uniform hydrophobization of the fiber cement product can be achieved without negatively affecting any other beneficial characteristics of the product, such as strength, weathering resistance etc.

Using the above described method, a hydrophobization degree (i.e. wt % of hydrophobizing agent in total mass of end product) of between about 0.2% to about 1%, such as between about 0.2% and about 0.6% is achieved.

In certain particular embodiments, the processes according to the invention are continuous processes, meaning that the formation of a fiber cement film and subsequently a hydrophobized fiber cement product is performed in a continuous way, i.e. without any interruption in between any of the different steps of the process and/or in between one cycle of a fiber cement product formation and a following cycle of a (i.e. another) fiber cement product formation. Thus, in these embodiments the process of the present invention involves forming an endless fiber cement film on a sieve rotating within a mass of fiber cement slurry and transferring the endless fiber cement film onto an endless transport belt upon followed by accumulating the endless film onto an accumulator roll, characterized in that the endless film is hydrophobized by applying a mist of a hydrophobizing agent at a certain stage of the process, i.e. prior to, during or after the accumulation of the film. Thus, in these embodiments where the processes of the invention are performed continuously, all steps of the processes of the invention are continuously repeated.

In certain other particular embodiments, the processes according to the invention are discontinuous processes, meaning that the formation of a fiber cement film and subsequently a hydrophobized fiber cement product is performed in a discontinuous way, i.e. being characterized by one or more interruptions occurring in between any of the different steps of the process and/or in between one cycle of a fiber cement product formation and a following cycle of a (i.e. another) fiber cement product formation. In certain particular embodiments, where the processes of the invention are performed discontinuously, one or more steps of the discontinuous process may be repeated. In further particular embodiments, one or more steps of the discontinuous process may be performed simultaneously, i.e. occurring at the same time. In yet further particular embodiments, one or more steps of the discontinuous process may be performed alternatingly, i.e. each step occurring repeatably but at a different time closely following-up the other step.

In this manner, by making use of a consecutively installed Hatschek section and one or more hydrophobization sections as described herein, hydrophobized fiber cement products having a specific predetermined combination of hydrophobized an non-hydrophobized fiber cement film layers can be manufactured by the processes of the invention.

While any combination of hydrophobized fiber cement film layers and non-hydrophobized film layers can be envisaged for a particular hydrophobized fiber cement end product (i.e. in its finalized cut form), in certain particular embodiments, the hydrophobized fiber cement products according to the present invention are made by an alternate superimposition or alternate winding of a hydrophobized onto a non-hydrophobized film layer or vice versa on the accumulator roll until the desired number of layers is reached. In these embodiments, the step of applying a hydrophobizing agent is performed discontinuously, i.e. a hydrophobizing agent is applied at certain locations of the fiber cement film only at certain predetermined periods of time.

For instance, the step of applying a mist of a hydrophobizing agent may be started by discharging the agent at a certain location on an endless fiber cement film (which is either present on the endless belt or on the accumulator roll) either through one or more mechanisms of spattering, spraying, and/or sprinkling. In addition, the step of applying a hydrophobizing agent may be stopped by interrupting the spattering, spraying, and/or sprinkling of the agent on the endless fiber cement film (which is either present on the endless belt or on the accumulator roll).

In particular embodiments, the processes of the invention at least use one or more endless transport belts or conveyor belts, onto which the (optionally endless) fiber cement film layer(s) is (are) produced, dewatered and transported.

The transport or conveyor belts for use in the present invention can be made of any water-permeable material suitable for transport belts as commonly known to the person skilled in the art, as long as this material cannot be affected, damaged or harmed (e.g. through corrosion) upon contact with a fiber cement slurry composition. Suitable materials for water-permeable transport belts for use in the present invention are known to the skilled person and are for example but not limited to felt materials.

The belts as used in the present invention are typically water-permeable so as to allow the fiber cement film layers to be optimally dewatered during the entire production process.

In particular embodiments, the water-permeable belts as used in the invention are endless belts, which are water-permeable over their entire surface. In other particular embodiments, the water-permeable belts as used herein are endless belts, which are partially water-permeable, i.e. water-permeable at only one or more concrete regions of the belt surface.

In yet other particular embodiments, the water-permeable belt as used herein may represent one or more endless belts, placed in a consecutive and/or parallel arrangement, each of which one or more belts are either partially or completely water-permeable, i.e. water-permeable at their entire surface or at one or more specific regions of their surface, respectively.

The processes according to the present invention may further comprise the step of cutting the fiber cement product (as formed on the accumulator roll) to a predetermined length. Cutting the fiber cement sheet to a predetermined length can be done by any technique known in the art, such as but not limited to water jet cutting, air jet cutting or the like. The fiber cement sheets can be cut to any desirable length, such as but not limited to a length of between about 1 m and about 15 m, such as between about 1 m and about 10 m, more particularly between about 1 m and about 5 m, most particularly between about 1 m and about 3 m.

It will be understood by the skilled person that the processes of the present invention may further comprise additional steps of processing the produced fiber cement products.

For instance, in certain particular embodiments, during the processes of the present invention, the fiber cement slurry and/or the fiber cement films or formed fiber cement products (such as fiber cement boards or sheets) can undergo various intermediate treatments, such as but not limited to treatment with one or more flocculants, additional or intermediate pressing steps, etc.

It will be clear to the person skilled in the art that such intermediate processing steps can be introduced in the processes of the invention at any stage, i.e. before, during and/or after any of the different steps of the processes of the invention.

As soon as the fiber cement sheet is formed, it may optionally be trimmed at the lateral edges. The border strips can optionally be recycled through immediate mixing with the recycled water and directing the mixture to the mixing system again.

In particular embodiments of the present invention, the processes of the present invention may further comprise the step of producing a corrugated hydrophobized fiber cement sheet from the obtained hydrophobized fiber cement sheet. In these embodiments, the step of producing the corrugated fiber cement sheet may comprise for example at least the step of transferring the obtained fiber cement sheet to a corrugated sheet mold to form a corrugated fiber cement sheet. However, other techniques to produce corrugated sheets from flat sheets are known to the skilled person and may as well be used in combination with the processes of the present invention in order to obtain corrugated fiber cement sheets.

In particular embodiments, the processes of the invention may further comprise the step of curing the obtained hydrophobized fiber cement sheets. Indeed, after production, fiber cement products can be allowed to cure over a time in the environment in which they are formed, or alternatively can be subjected to a thermal cure (e.g. by autoclaving or the like).

In further particular embodiments, the "green" fiber cement sheet is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In yet further particular embodiments, the "green" fiber cement sheet may be first pre-cured to the air, after which the pre-cured product is further air-cured until it has its final strength, or autoclave-cured using pressure and steam, to give the product its final properties.

According to the process of the present invention, the resulting fiber cement sheet leaves the forming cylinder in an uncured and green state. Thus, the superimposed fiber cement film layers (each of which is either hydrophobized or non-hydrophobized) are subsequently co-cured, thereby producing a strong interfacial layer bonding, which avoids delaminations during handling, cutting, installation and service; the assembly of the layers manufactured in the process according to the invention does not require any adhesive. Advantageously, the resulting fiber cement sheet is autoclaved.

In particular embodiments of the present invention, the processes may further comprise the step of thermally drying the obtained hydrophobized fiber cement sheets. After curing, the fiber cement product being a panel, sheet or plate, may still comprise a significant weight of water, present as humidity. This may be up to about 10 weight % even 15 weight % (wt %), expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

In a second aspect, the present invention provides apparatuses for manufacturing hydrophobized fiber cement products, the apparatuses at least comprising:

(i) a Hatschek section for the formation of one or more Hatschek fiber cement layers, at least comprising:
    a felt transport belt
    one or more machine vats suitable for being fed with a fiber cement slurry,
    one or more sieves for producing a fiber cement film on the felt transport belt, each of which sieves is housed within the one or more machine vats so as to be in contact with the fiber cement slurry when in operation, and
    an accumulator roll for accumulating the fiber cement film via the felt transport belt, (ii) a hydrophobization section for applying a hydrophobizing agent to the fiber cement film, comprising at least one distribution system, which is suitable for discharging a thin layer of the hydrophobizing agent onto the fiber cement film.

In certain particular embodiments, the at least one distribution system is a a a spattering distribution device, a spraying distribution device, and/or a sprinkling distribution device.

In particular embodiments, one or more hydrophobized fiber cement film layers and one or more non-hydrophobized fiber cement film layers are superimposed on the accumulator roll in a predetermined order.

In particular embodiments, the apparatuses according to the present invention further comprise cutting means for cutting the uncured fiber cement product to a predetermined length.

In particular embodiments, the apparatuses according to the present invention further comprise means to (simultaneously or alternatingly) activate or deactivate the Hatschek section and the hydrophobization section.

In further particular embodiments, the above means comprise means to activate or deactivate the distribution of hydrophobization agent from the one or more distribution systems, such as but not limited to switch means. Thus, in particular embodiments, switch means can be installed in connection with an electrical circuit and/or an electronical mechanism, which operates to activate or deactivate the hydrophobation section (while the Hatschek section continues to work).

In particular embodiments, the apparatuses according to the present invention further may comprise one or more units known per se for trimming, cutting, setting, drying, optionally impregnating, stacking and/or packaging of the sheets.

The apparatuses according to the invention are highly compact and thereby allow to produce fiber cement products comprising any combination of superimposed hydrophobized and non-hydrophobized fiber cement film layers.

In a third aspect, the present invention provides fiber cement products, e.g. sheets, obtainable by the processes according to the invention as described in detail herein.

The fiber cement products manufactured according to the processes of the present invention combine high strength (due to the presence of the Hatschek layers) and good to excellent water-repellant properties (due to the presence of the internally incorporated hydrophobizing layers layers).

In particular embodiments, the hydrophobized fiber cement products according to the present invention can be composed of:
- a hydraulic binder, preferably present in a concentration of about 10 to about 95 wt % (with respect to the initial total weight in the dry state of the composition); more preferably for autoclave-cured products from about 20 to about 50 wt %, and most preferably from about 25 wt % to about 40 wt % or more preferably for air-cured products from about 70 to about 90 wt %, and most preferably from about 65 wt % to about 85 wt %;
- auxiliary materials including but not limited to inert fillers, additives improving or achieving specific product performance, pozzolans, processing aids, . . . optionally present in a concentration of about 0 to about 80 wt %, more particularly less than about 50 wt %;
- fibers, optionally present in a concentration of about 1 wt % to about 25 wt %
- one or more hydrophobizing agents.

In certain particular embodiments, the one or more hydrophobizing agents used for the production of the hydrophobized fiber cement products of the invention at least comprise a silicon, such as for example a silicone oil and/or a silicone varnish. In further particular embodiments, the one or more hydrophobizing agents used for the production of the hydrophobized fiber cement products of the invention at least comprise one or more of the ingredients chosen from the group consisting of: an alkylsilicon, an alkylalkoxysilicon, an alkylsilane, an alkylalkoxysilane, a polydiorganosiloxane, an organo-modified siloxane, an organo-modified alkoxysilane, a silicone hydride, and a silicone resin.

The orientation of the fibers in the products manufactured according to the processes of the invention is primarily parallel to the planar series of fiber cement monolayers of the sheet, and especially in the machine loading direction. This planar orientation imparts the strength of the fiber reinforced cement building material.

In the context of the present invention, fiber cement products or sheets are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), one or more hydrophobizing agents, limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, anti-foaming agents, flocculants, and/or other additives. Optionally color additives (e.g. pigments) are added, to obtain a fiber cement product which is so-called colored in the mass.

In particular embodiments, the fiber cement sheets obtainable by the processes of the invention have a predetermined thickness of at least about 3 mm, because otherwise the losses of solid matter with the aspired water increase strongly. In more particular embodiments, the fiber cement sheets obtainable by the processes of the invention have a predetermined thickness of between about 8 mm and about 200 mm, such as between about 10 mm and about 200 mm.

The thickness of the sheets is the control value for the amount of material supplied per time unit. In particular embodiments, the thickness of the produced sheets can be measured. This can for instance be done through a contact lens profile measurement.

The fiber cement products or sheets as referred to herein include roof or wall covering products made out of fiber cement, such as fiber cement sidings, fiber cement boards, flat fiber cement sheets, corrugated fiber cement sheets and the like. According to particular embodiments, the fiber cement products according to the invention can be roofing or façade elements, flat sheets or corrugated sheets.

According to further particular embodiments, the fiber cement products of the present invention are fiber cement sheets.

The fiber cement products of the present invention comprise from about 0.1 weight % to about 5 weight %, such as particularly from about 0.5 weight % to about 4 weight % of fibers, such as more particularly between about 1 weight % to 3 weight % of fibers with respect to the total weight of the fiber cement product.

According to particular embodiments, the fiber cement products according to the invention are characterized in that these comprise fibers chosen from the group consisting of cellulose fibers or other inorganic or organic reinforcing fibers in a weight % of about 0.1 to about 5. In particular embodiments, organic fibers are selected from the group consisting of polypropylene, polyvinylalcohol polyacrylonitrile fibers, polyethyelene, cellulose fibres (such as wood or annual kraft pulps), polyamide fibers, polyester fibers, aramide fibers and carbon fibers. In further particular embodiments, inorganic fibers are selected from the group consisting of glass fibers, rockwool fibers, slag wool fibers, wollastonite fibers, ceramic fibers and the like. In further particular embodiments, the fiber cement products of the present invention may comprise fibrils fibrids, such as for example but not limited to, polyolefinic fibrils fibrids % in a weight % of about 0.1 to 3, such as "synthetic wood pulp".

According to certain particular embodiments, the fiber cement products of the present invention comprise 20 weight % to 95 weight % cement as hydraulic binder. Cement in the products of the invention is selected from the group consisting of Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, amorphous silica, ground quartz, the ground rock, clays, pigments, kaolin, metakaolin, blast furnace slag, carbonates, puzzolanas, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art. In particular embodiments, the total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 weight % and about 1 weight % compared to the total initial dry weight of the composition.

According to a fourth aspect, the present invention provides uses of the fiber cement products and fiber cement sheets obtainable by the processes and apparatuses according to the present invention in the building industry. In particular embodiments, the fiber cement sheets produced by the processes of the present invention can be used to provide an outer surface to walls, both internal as well as external a building or construction, e.g. as façade plate, siding, etc.

In order to further illustrate the invention, a specific embodiment of the invention will now be explained in detail, without being limited however to the specific steps and features of this particular embodiment.

According to this specific embodiment, the process comprises producing a hydrophobized fiber cement product comprising a first non-hydrophobized fiber cement film layer, a second hydrophobized fiber cement film layer and a third non-hydrophobized layer. Therefore, in the final product, the skin face film layers of the panel are non-hydrophobized while the core film layer of the panel is hydrophobized at one side. As already explained above, the invention is not limited to this particular product configuration and of course also includes all other possible combinations of superimposed hydrophobized and non-hydrophobized layers, including fiber cement sheets, wherein the skin faces of the panel are represented by hydrophobized film layers while the core layer of the panel is represented by a non-hydrophobized film layer.

Figure 2:
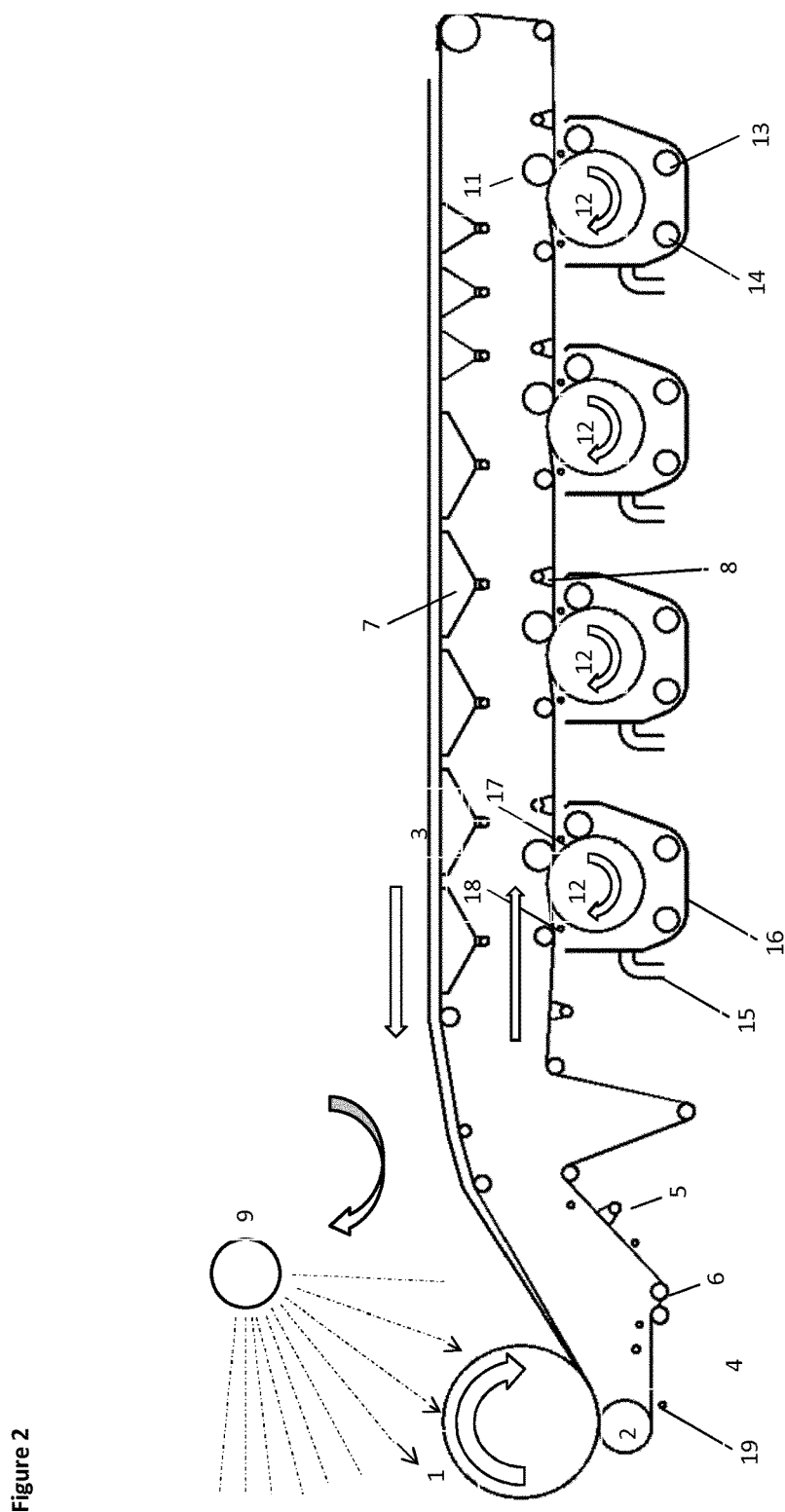
FIG. 2 is a schematic illustration of one embodiment of the process and apparatus according to the invention encompassing a combination of a Hatschek section with a hydrophobation section, which includes a spraying device installed adjacent to the accumulation roll.
Figure 3:
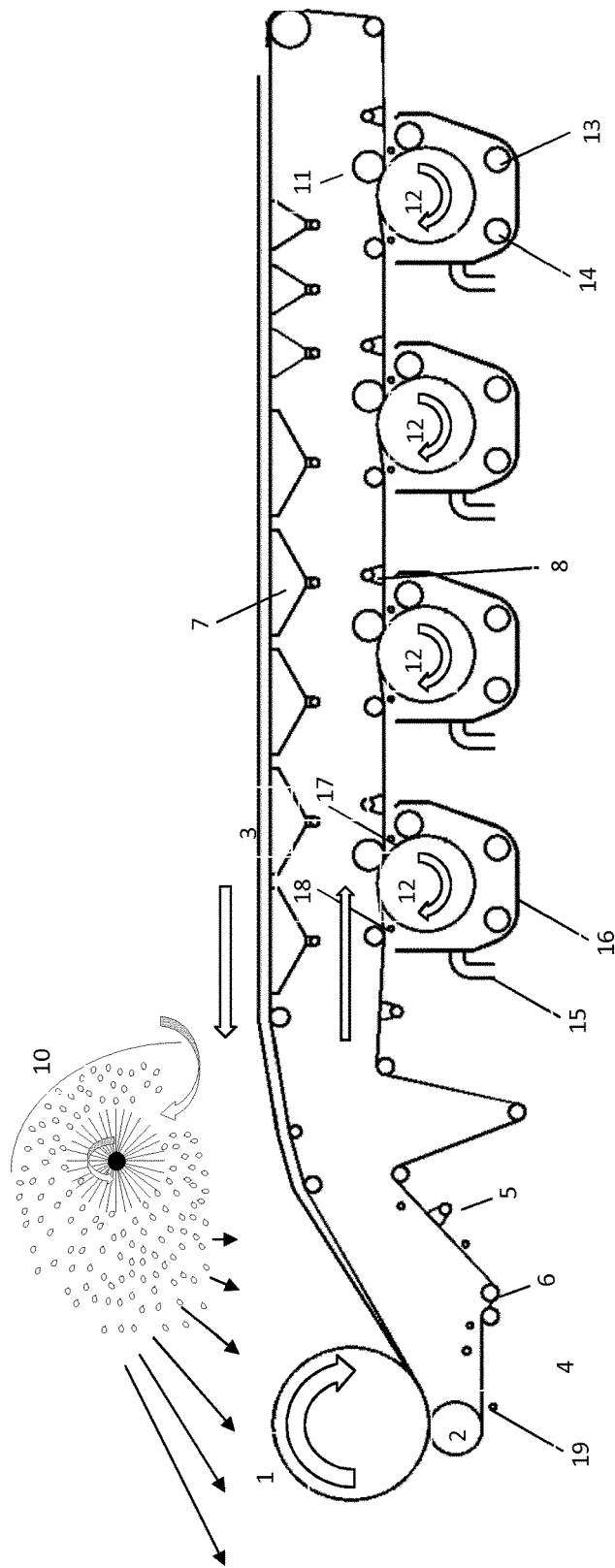
FIG. 3 is a schematic illustration of one embodiment of the process and apparatus according to the invention encompassing a combination of a Hatschek section with a hydrophobation section, which includes a spattering device installed adjacent to the accumulation roll.

As can be seen in FIGS. 1 to 3, the apparatuses according to the invention comprise a conveyor felt belt (3) driven by a main drive (2). Having regard to the present illustrated embodiment, in such devices, the Hatschek section comprising a series of machine vats (16), each of which is fed by a fiber cement slurry and each of which houses a rotating sieve (12). The first step (i) of the process according to the invention is carried out according to the Hatschek process which is a modified sieve cylinder paper making machine. It consists in forming a sheet comparable to a paper, by filtration using a fluid aqueous suspension obtained by mixing essentially a hydraulic binder such as cement, fibers, water, and optionally processing aids and other auxiliary materials. This slurry whose consistency is preferably in the range of 40 g/l to 120 g/l is fed to the machine vats (16) through the inlets (15). Rotating sieves (12) housed within these vats (16) are suspended partially within this slurry. Each sieve (12) consists of a drum covered with a filter cloth and each vat (16) also comprises an orientation screw (13) and a vat agitator (14) to agitate the slurry fed by means of the vat feeding inlet (15). Since the sieve rotates in the vat, the hydrostatic pressure forces some of the water to pass through the filter cloth, whereas the solids, that is to say notably the fibers, the cement particles and optionally other auxiliary materials, build up on the screen of the drum as a thin layer, which is called the mono-layer, primary or single layer. The fibers hold to the sieve, forming an additional screen, the mesh cells of which have a size suitable for retaining the particles, even fine particles, of cement or of other binder or additive, together with an important amount of water, which contributes to the cohesion of the layer being formed on the screen. The retention on the sieve can be further enhanced by the addition of flocculants. This monolayer, which has a thickness of about 0.3 mm, is then in step (ii) conveyed by means of the felt belt (3). From the next vat (16), another layer is applied by the sieve (12). At the final vat (16), another layer is applied by the sieve (12). The Hatschek section is located beneath the felt belt (3) where the fiber cement layer adheres to the underneath of the felt via inverted vacuum boxes (8). The formed fiber cement layer is further dewatered by press rollers (11) and vacuum boxes (7) and (8), and conveyed by means of the felt belt (3) to the forming cylinder (1) while passing the hydrophobation section of the apparatus (step (iii) of the process according to the invention) according to this particular embodiment of the invention. During this operation, the hydrophobization section may be either in a non-operating state (when a non-hydrophobized film layer piece is to be prepared) or in an operating state (when a non-hydrophobized film layer piece is to be prepared).

When the hydrophobization section is in operation, hydrophobizing agent is sprayed (FIGS. 1 and 2), spattered (FIG. 3), or sprinkled by means of one or more devices located either before (FIG. 1), adjacent to (FIGS. 2 and 3) or after the accumulator roll.

The hydrophobization step can be repeated discontinuously or performed continuously until the desired design of hydrophobized and non-hydrophobized layers forming the resulting fiber cement sheet is obtained.

Thus, different series of fiber cement film layers (either hydrophobized or non-hydrophobized, depending on the operation program of the hydrophobization section) are built up, to form a hydrophobized fiber cement Hatschek layer wound around the accumulation roll (forming cylinder) (1) (step (iv) of the process according to the invention). This process is continued until the desired thickness of the sheet has been achieved.

When the predetermined design has been obtained, the green uncured sheet on the forming cylinder is cut. This operation can be done manually with a knife following a groove in the cylinder or automatically with a steel blade incorporated in the forming drum or with a wire. The next composite sheet can then be manufactured. The composite sheet is optionally post-compressed and subsequently left to harden under atmospheric conditions (air-curing) or under pressurized steam at a temperature above 100° C. (autoclaving).

In particular embodiments, the obtained hydrophobized fiber cement products can optionally be treated in various ways. For instance, the fiber cement products can be pressed by mechanical means, such as by a (cylindrical) belt press. Alternatively, or additionally, the obtained hydrophobized fiber cement products can be treated with various agents so as to improve or alter their structure or properties.

The invention claimed is:

1. A process for manufacturing a hydrophobized fiber cement product, said process comprising the steps of:
   (i) forming at least one fiber cement film on a rotating sieve in contact with a fiber cement slurry in a vat;
   (ii) transferring said at least one fiber cement film from said sieve to a felt transport belt,
   (iii) applying a mist of a hydrophobizing agent to said at least one fiber cement film in an amount of 0.1 mg/cm$^2$ to 2 mg/cm$^2$ to produce strong water-repellent properties throughout an internal structure of the film, and
   (iv) accumulating the fiber cement film on an accumulator roll via the felt transport belt, to form a hydrophobized fiber cement product.

2. The process according to claim 1, wherein said step (iii) of applying a mist of a hydrophobizing agent to said at least one fiber cement film is performed simultaneously with said step (iv) of accumulating the fiber cement film on an accumulator roll via the felt transport belt.

3. The process according to claim 2, wherein one or more of said steps i) to iv) are repeated.

4. The process according to claim 3, which is a continuous process.

5. The process according to claim 1, wherein said step (iii) of applying a mist of a hydrophobizing agent to said at least one fiber cement film is performed prior to said step (iv) of accumulating the fiber cement film on an accumulator roll via the felt transport belt.

6. The process according to claim 5, wherein one or more of said steps i) to iv) are repeated.

7. The process according to claim 1, wherein one or more of said steps i) to iv) are repeated.

8. The process according to claim 1, which is a continuous process.

9. The process according to claim 1, wherein said step (iii) of applying a mist of a hydrophobizing agent to said at least one fiber cement film is performed by a step selected from the group consisting of spraying, spattering, and evaporating a thin layer of hydrophobizing agent onto said at least one fiber cement film and mixtures thereof.

10. The process according to claim 1, wherein said hydrophobizing agent is applied as a thin layer having a thickness of between about 0.01 mm and about 1 mm.

11. The process according to claim 1, wherein said hydrophobizing agent comprises a component comprising silicon (Si).

12. The process according to claim 1, wherein said hydrophobizing agent comprises a silicone oil and/or a silicone varnish.

13. The process according to claim 1, wherein said hydrophobizing agent comprises an ingredient selected from the group consisting of an alkylsilicon, an alkylalkoxysilicon, an alkylsilane, an alkylalkoxysilane, a polydiorganosiloxane, an organo-modified siloxane, an organo-modified alkoxysilane, a silicone hydride, and a silicone resin and mixtures thereof.

14. The process according to claim 1, further comprising the step of cutting the hydrophobized fiber cement product obtained in step (iv) to a predetermined length.

15. The apparatus according to claim 14, wherein said at least one distribution system is a spattering distribution device, a spraying distribution device, and/or a sprinkling distribution device.

16. The process according to claim 1, further comprising the step of curing the hydrophobized fiber cement product obtained in step (iv).

17. Fiber cement product obtainable by the process according to claim 1.

18. The process according to claim 1, wherein said mist is an aerosol of suspended droplets of said hydrophobizing agent in air.

19. The process according to claim 18, wherein said droplets have a diameter of between about 0.2 µm to about 200 µm.

20. Apparatus for manufacturing a hydrophobized fiber cement product, said apparatus comprising:
(i) a Hatschek section for the formation of one or more Hatschek fiber cement layers, comprising:
a felt transport belt,
one or more machine vats suitable for being fed with a fiber cement slurry,
one or more sieves for producing a fiber cement film on said felt transport belt, each of which sieves housed within said one or more machine vats to be in contact with the fiber cement slurry when in operation, and
an accumulator roll for accumulating said fiber cement film via said felt transport belt, and
(ii) a hydrophobization section for applying a mist of a hydrophobizing agent onto said fiber cement film, comprising at least one distribution system configured for discharging a thin layer of said hydrophobizing agent as an aerosol of a suspension of droplets having a diameter of between about 0.2 µm to about 200 µm onto said fiber cement film.

* * * * *